Figure 3:
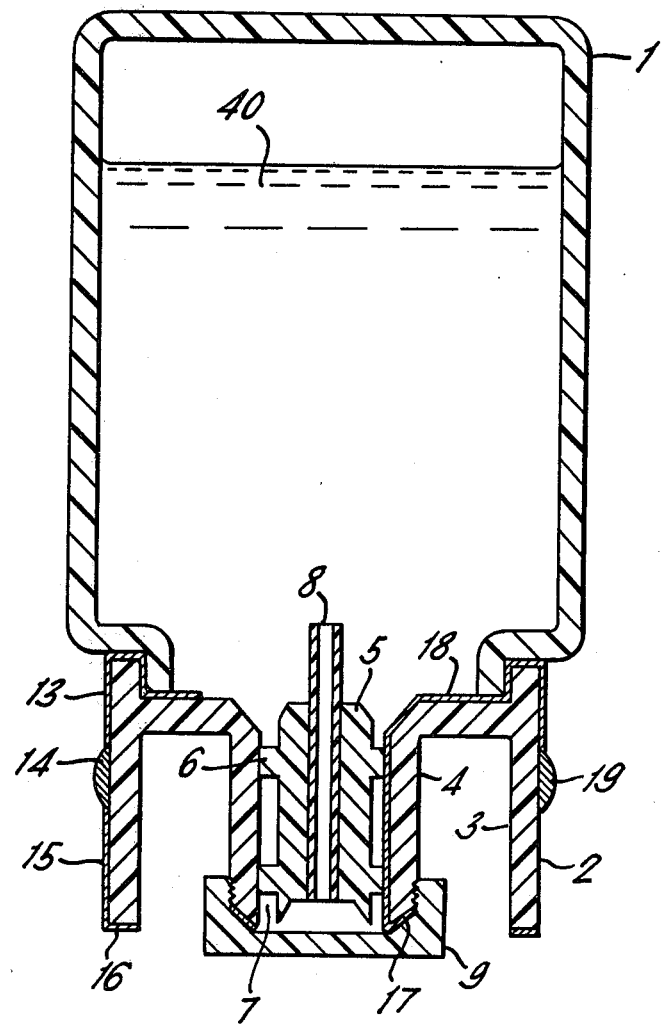

United States Patent [19]

Coffee

[11] 4,275,846
[45] * Jun. 30, 1981

[54] CONTAINER FOR ELECTROSTATIC SPRAYING OF LIQUIDS

[75] Inventor: Ronald A. Coffee, Haslemere, England

[73] Assignee: Imperial Chemical Industries Limited, London, England

[*] Notice: The portion of the term of this patent subsequent to Jun. 24, 1997, has been disclaimed.

[21] Appl. No.: 78,434

[22] Filed: Sep. 24, 1979

[30] Foreign Application Priority Data

Sep. 26, 1978 [GB] United Kingdom ............... 38180/78

[51] Int. Cl.³ ................................................ B05B 5/02
[52] U.S. Cl. ..................................... 239/690; 361/228
[58] Field of Search ................... 239/3, 690, 691, 696, 239/302, 376, 377, 379; 118/629; 427/30; 361/228

[56] References Cited

U.S. PATENT DOCUMENTS

| 3,495,779 | 2/1970 | Renner et al. | 239/691 |
| 4,120,015 | 10/1978 | Haller | 239/696 X |
| 4,165,022 | 8/1979 | Bentley et al. | 239/704 X |
| 4,209,134 | 6/1980 | Coffee | 239/690 |

Primary Examiner—Evan K. Lawrence
Attorney, Agent, or Firm—Cushman, Darby & Cushman

[57] ABSTRACT

A system for the electrostatic spraying of liquids, particularly suitable for the application of pesticides at low volume. A sealable demountable container and support are provided, liquid being supplied from the container for atomization to an electrically conductive nozzle charged from one output terminal of a high voltage generator. Another output terminal of the high voltage generator connects to a field-intensifying electrode adjacent the nozzle, the electric circuit in the holder being completed by connections in the container. The nozzle and electrical power source preferably are carried on the container.

12 Claims, 9 Drawing Figures

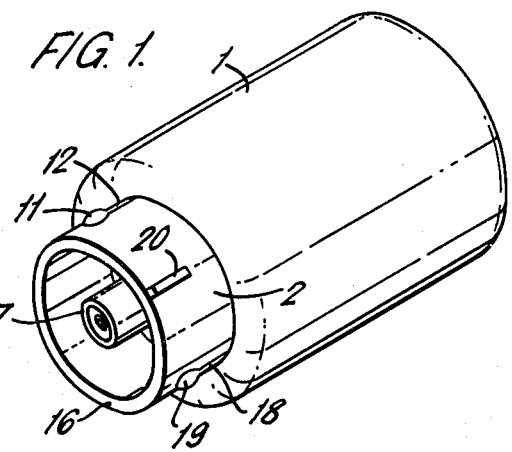
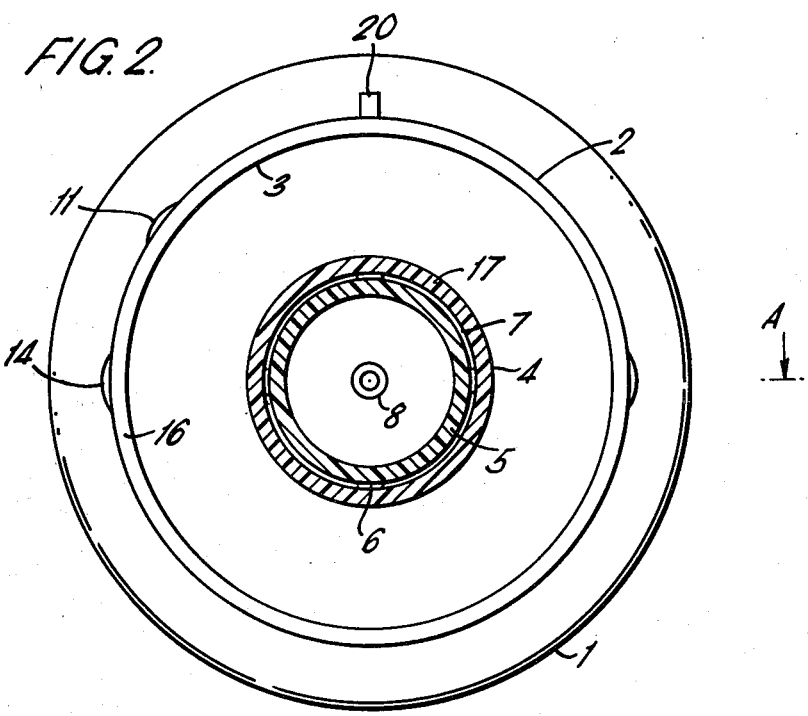

CONTAINER FOR ELECTROSTATIC SPRAYING OF LIQUIDS

This invention relates to containers, and in particular to containers for use in the electrostatic spraying of liquids.

In our copending Application No. 29539/76 (U.S. Ser. No. 812,440) we have described an apparatus for the electrostatic spraying of liquids. This apparatus is of simple construction, with a low power requirement (it has no moving parts and can readily be run off dry cells); it is thus particularly suited for use as a hand held sprayer in applications where large power sources are not readily available: for example, in spraying crops. Electrostatic spraying of crops also has advantages in promoting even coating of plants, with spray being attracted around and behind foliage instead of coating only exposed surfaces; and in reducing spray drift, which is at best wasteful and at worst hazardous to the environment.

The apparatus disclosed in Application No. 29539/76 comprises essentially a discharge nozzle; an electrode disposed around the nozzle; a container for supplying liquid to be sprayed to the nozzle; and a high voltage generator for applying a high voltage to the electrode, the electrode being earthed. In this way a strong electric field may be produced between the nozzle and the electrode, sufficient to atomise liquid passing through the nozzle.

This apparatus is particularly suitable for the application of pesticides at low or ultra-low volume (typically at a spray application rate in the range 0.5 to 10 liters spray liquid per hectare). Low and ultra-low volume spraying have several recognised advantages, as well as being especially suitable where water is not readily available as a spray diluent, but they also have one disadvantage. Of necessity, they must use relatively concentrated pesticidal compositions. Such compositions frequently have a greater or lesser degree of human toxicity, and for this reason it is desirable that they should be handled as little as possible. A particular danger is the decantation of poisonous liquids into beverage bottles.

A pesticide sprayer, to provide the best service, must be reliable and adaptable. Desirably it should be able to spray pesticides of several different kinds. Different pesticides come in different formulations, having different electrical properties, and requiring to be sprayed in differing droplet sizes to give optimum effect. In the apparatus of our copending Application No. 29539/76 (U.S. Ser. No. 812,440) useful and convenient control over droplet size and spraying properties can be provided by varying the applied voltage; but the size of the nozzle and the relative size and position of the surrounding electrode may also require adjustment to suit the formulation being sprayed. It is often difficult to do this reliably in the field. Also, pesticide sprayers (spray-tanks and spray-lines) normally require careful cleaning between application of different pesticides; otherwise, for example, traces of herbicide may damage crops being sprayed against fungal attack. The need for such cleaning is increased when formulations are to be sprayed electrostatically, since contamination may affect their electrical properties. Thorough cleaning may damage nozzles, leading to incorrect spray application.

The object of the present invention is to provide containers suitable for use in electrostatic spraying apparatus of the kind described in U.K. Patent Application No. 29539/76 (U.S. Ser. No. 812,440) which enable a number of the problems outlined above to be mitigated or overcome.

According to the present invention in its broadest aspect, we provide a liquid container adapted to form part of apparatus for electrostatic spraying, the apparatus including a power source, a high voltage generator, a spray nozzle at least part of the surface of which is electrically conductive, an electrode disposed adjacent the nozzle and insulated therefrom with electrical connections for connecting the power source to the input terminals of the generator, the electrode to one output terminal and the nozzle to the other output terminal of the generator; the container having an orifice for delivering liquid, mounting means for locating the container on the apparatus in a position in which the orifice can deliver liquid to the spray nozzle, the mounting means including a conductor or conductors completing said electrical connections; and a closure or seal for closing the orifice prior to location of the container on the apparatus.

We further provide apparatus for electrostatic spraying as defined above, suitable for receiving a container according to the invention; and we further provide a sprayer formed by the combination of a container according to the invention mounted upon apparatus according to the invention. Throughout this specification, the term 'conducting surface' is intended to include a semi-conducting surface.

Prior to mounting on the spraying apparatus, the container orifice obviously requires to be sealed against the emission of liquid. One or more conventional sealing means may be employed, for example a screw cap or a metal foil seal over the orifice, or both. According to a preferred feature of the invention, the container seal is adapted to be opened when, and preferably only when, located on the spraying apparatus. Such opening may take place during such location, or subsequently: furthermore, the opening may be actuated mechanically or electrically. Thus, during the action of mounting the container on to the spraying apparatus, a knife or spike on the apparatus may cut or pierce a metal foil over the orifice of the container. The container orifice may be sealed by a valve, e.g. a spring-biassed ball valve which is opened during mounting by contact with a detent on the apparatus. With such a system the container orifice is automatically closed on removal from the apparatus which is particularly useful when the container still contains liquid. The same desirable end may also be accomplished by use of an electrostatic valve. Such a valve may be spring-biassed shut, and opened only by application of potential from the high voltage generator when the container is mounted on the apparatus. The electrostatic valve is particularly convenient because the container remains sealed even after being mounted on the apparatus, until the current is switched on.

In a narrower aspect of our invention, the spray nozzle forms part of the container rather than of the apparatus on which it is mounted. Thus, further according to the present invention we provide a container for liquid to be electrostatically sprayed, suitable for mounting on a holder carrying a high voltage generator, the container having: a spray nozzle at least part of the surface of which is electrically conductive; an orifice for delivering liquid to the nozzle; an electrode disposed about the nozzle and insulated therefrom; mounting means for locating the container on the holder; separate electrical connections from the nozzle and the electrode to separate contacts on the mounting means so placed that when the container is located on the holder by the mounting means each contact can make electrical connection with one output terminal of the high voltage generator; and a seal for closing the orifice prior to location on the holder.

We further provide a holder suitable for receiving a container according to the invention which comprises a body carrying a high voltage generator, and mounting means complementary to the mounting means on the container provided with separate electrical contacts complementary to those on the container for electrical connection to separate terminals of the high voltage generator.

A further feature of the invention is the sprayer formed by the combination of a container according to the invention mounted upon a holder according to the invention.

Preferably means are provided for maintaining one terminal of the high voltage generator at or near earth potential. Such means may be a conductor for connection to earth, for example, a trailing earth wire dependant from the holder. Where such means are provided, it is preferred that the earthed terminal of the high voltage generator is arranged for connection to the container electrode rather than to the nozzle. Charging of the spray is then by direct contact, rather than by induction, and there is a stronger electrostatic field transporting the spray to its (earthed) target.

If desired, one of the two electrical connections between the contacts on the container and the high voltage generator terminals may be through earth; though a more direct connection is sometimes convenient.

For most efficient operation the container also requires a means of equalising the external and internal pressure during spraying, for example an air vent, or non-rigid walls.

Containers according to the invention may be filled with properly formulated spray liquid by the manufacturer, and after the containers are closed, the spray liquid will remain uncontaminated until it is actually sprayed. There is no need to clean spray-tanks (or even spray-lines or nozzles, if the nozzle forms part of the container) to avoid contamination, so different products can be sprayed successively without undue loss of time. Toxic hazards through handling by operators are minimised; errors by field operators in mixing and dilution procedures are eliminated. After use, the containers according to the invention may be returned to the manufacturer for refilling; or may be discarded. Containers may be made from one or more elements of plastics material by, for example, injection moulding or blow moulding, or a combination of the two. The conducting elements of the containers (nozzle, electrode, contacts and connections) may be provided by metal inserts, or (for all parts except the contacts) by application of conductive metallic coatings or paints to the container surface or by the use of partly-conducting plastics.

It is possible to provide the energy source for the high voltage generator in the holder. It may be preferred however to provide it in the container. Accordingly, in a different aspect the invention provides a container for liquid to be electrostatically sprayed, suitable for mounting on a holder carrying a high voltage generator; the container being provided with: an orifice for delivering liquid to a spray nozzle; a power source capable of providing sufficient electrical energy to atomise electrostatically the actual or intended contents thereof; mounting means for locating the container on the holder; and separate electrical connections from the poles of the power source to separate contacts on the mounting means so placed that when the container is located on the holder by the mounting means each contact can make electrical connection with one input terminal of the high voltage generator; and a seal for closing the orifice prior to location on the holder. It is further preferred that the container be provided with a spray nozzle at least part of the surface of which is electrically conductive and an electrode disposed about the nozzle and insulated therefrom, the nozzle and the electrode being disposed to be electrically connected via contacts on the mounting means to opposite terminals of the high voltage generator when the container is located on the holder; but a sometimes convenient alternative is to provide such an electrode, or such a nozzle, or both, on the holder. In a particularly convenient arrangement, the mounting means on the container has three electrical contacts; one for connecting one pole of the power source to a first input terminal of the generator; one for connecting the nozzle to a first output terminal of the generator; and one for connecting the second pole of the power source and the electrode to a conductor on the holder connected to the second input and ouput terminals of the generator, and capable of connection to earth.

One suitable form of power source is an electrical storage battery. The amount of electrical energy required to atomise liquid is remarkably low. A typical example may be considered: a vessel containing 500 ml of liquid to be sprayed at a rate of 0.5 ml per second, with a droplet size of about 100 microns, and a charge to mass ratio of $5\times10^{-3}$ coulombs per kilogram. The current carried by droplets atomising from the nozzle is thus 2.5 microamperes. The spraying time will be 1000 seconds (just over quarter of an hour) at an input current of, typically, 15 milliamperes, an input voltage of about 10 volts and an output voltage of 20 kilovolts. Thus the required cell rating is only 4 milliampere hours, at about 10 volts. This capacity is considerably less than that of most readily available torch batteries. If the containers are to be discarded after use, batteries of the necessary rating can be made cheaply on a large scale; alternatively, small quickly rechargeable batteries may be used. An example of another form of power source which may be used in the invention is a solar cell. Suitable high voltages for use in the invention range from about 1 to about 30 kilovolts, and most conveniently from about 5 to about 20 kilovolts.

A specific embodiment of the invention will now be described with reference to the drawings, in which:

FIG. 1 is a perspective view of a container according to the invention;

FIG. 2 is an end view of a container according to the invention;

FIG. 3 is a vertical section through the container on the line AA of FIG. 2;

FIG. 4 is a plan view of the holder;

FIG. 5 is a plan view of the collar of the container;

FIG. 6 is a circuit diagram of the circuit formed when the container is mounted on the holder.

FIG. 7 is a vertical section through the neck of a second container according to the invention.

FIG. 8 is a vertical section through the neck of a third container according to the invention.

FIG. 9 is a plan view of plate 54 shown in FIG. 8.

With reference generally to FIGS. 1 to 3 and 5, the container comprises a generally flask-shaped body (1) of blow-moulded high density polyethylene, the neck of which is in liquid-tight sealed engagement with a collar (2) injection-moulded from polyacetal. It contains a solution (40) of 10% by weight of an insecticide in an aromatic hydrocarbon solvent. The collar (2) is formed of two concentric cylinders (3) and (4) joined near their ends to form an annulus. Within the inner cylinder (4) is a polyacetal plug (5), whose external diameter is somewhat less than that of the internal diameter of the cylinder (4). The plug (5) is held in place within the cylinder (4) by outwardly projecting lugs (6). It thus forms, in cooperation with the cylinder (4), an annular channel (7) of capillary dimensions through which spray liquid may pass. The plug (5) is also provided with a central bore carrying a polythene capillary tube (8) which extends upwardly into the body (1) of the container. The annular nozzle formed by the combination of the plug (5) and the cylinder (4) is closed against liquid leakage by sealing cap (9) (shown in position only in FIG. 3). Within the container on the upper surface of the collar (2) is carried a 10 volt battery (10). This battery is specially constructed, and contains sufficient electrical energy to atomise the liquid in the container, with an extra margin of 50% to allow for electrical leakage. The positive pole of the battery (10) is connected to a brass contact stud (11) on the outer wall of the collar (2) by a strip (12) of electrically conductive paint, passing from the battery (10) up over the rim of the collar (2) and down the outside thereof. The negative pole of the battery (10) is connected, by a similar conductive strip (13), to a second brass contact stud (14). Stud (14) is also connected, by a similar conductive strip (15), to the rim (16) of the cylinder (3). This rim (16) is itself coated with electrically conductive paint, to form an annular conductor. Similarly, the rim (17) of the inner cylinder (4) is coated with electrically conductive paint to form an annular conductor. The conductive rim (17) is connected by an electrically conductive paint strip (18), passing down the inside of the cylinder (4) and over the top rim of the collar, to a third brass contact stud (19) on the outside of the collar (2). To prevent current leakage through the spray liquid, the conductive strips (12), (13) and (18) are protected within the body (1) of the container by insulating varnish. A projecting key (20) is also formed on the outside of collar (2).

Figure 4:
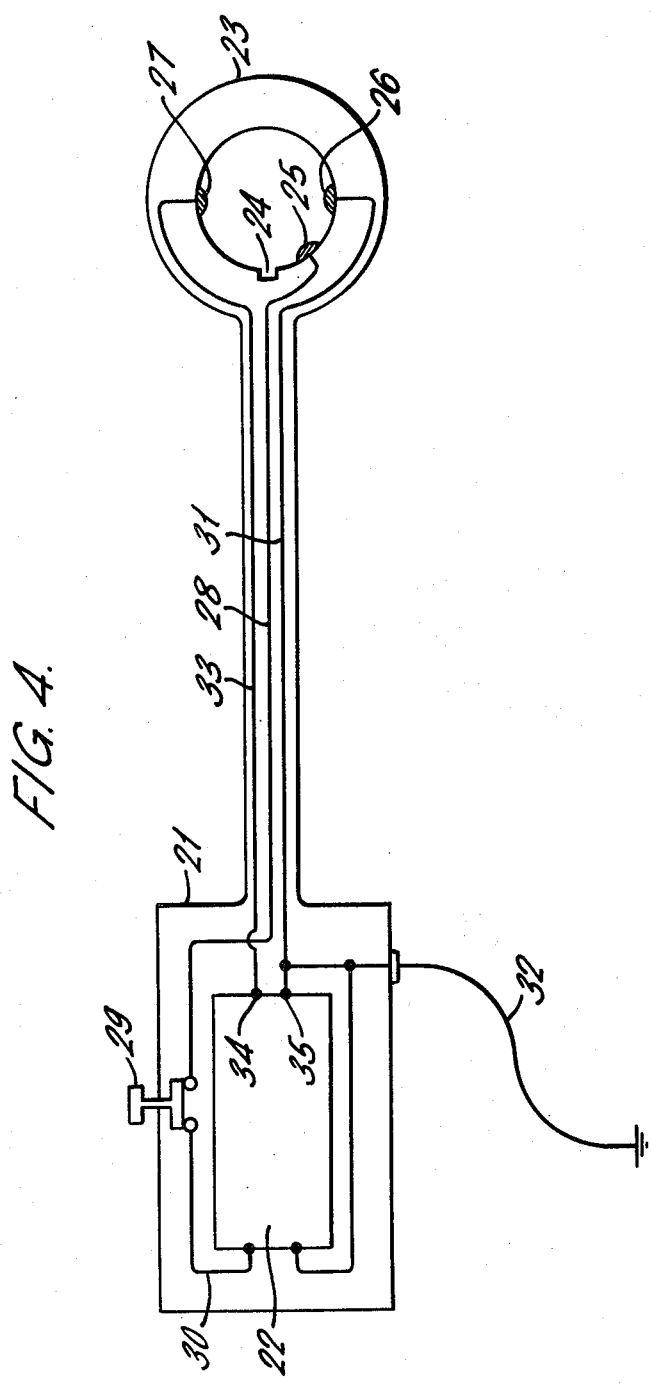
Figure 5:
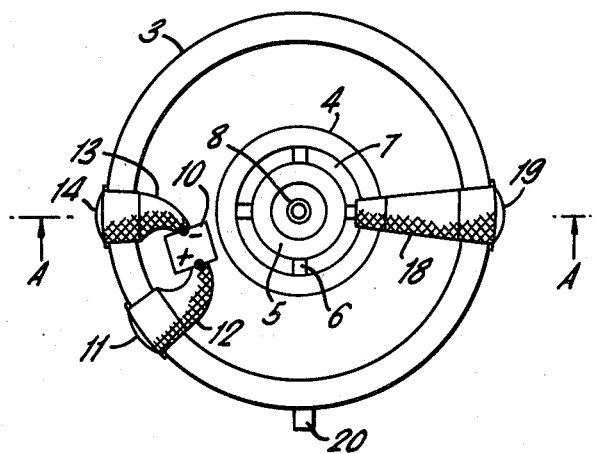

With reference now principally to FIG. 4, the holder for the container comprises a body (21) suitable for holding in the hand carrying a variable high voltage generator (22) (233P, 0–20 kilovolts, 200 microamp module, ex Brandenburg Limited). The body (21) is of generally elongated form, and terminates in a ring (23), the inside of which is adapted to receive the collar (2) of the container. A key way (24) corresponds to the key (20) on the collar (2). Brass contacts (25), (26) and (27) are mounted on the inside of the ring (23) so as to be able to contact studs (11), (14) and (19) on the container, respectively. Stud (25) is connected by an insulated electrical conductor (28) to a switch (29), which, in the 'on' position, leads via a conductor (30) to the input terminal of the high voltage generator (22). Stud (26) is connected via an insulated electrical conductor (31) to a conductor (32) for connection to earth: the conductor (32) is a metal wire with a bared end for trailing along the ground. The stud (27) connects via an insulated electrical conductor (33) to the positive high voltage output terminal (34) of the generator (22). The negative output terminal (35) of the generator (22) is connected to the earth wire (32).

Figure 6:
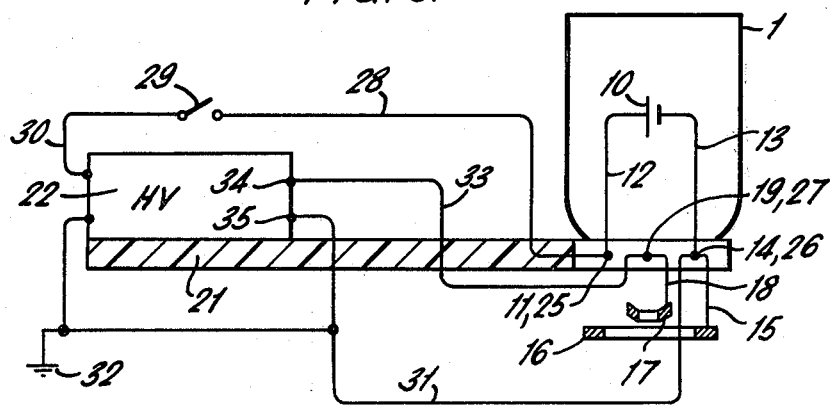

In operation, the container is placed in an upright position, and the sealing cap (9) removed. The ring (23) of the holder is then placed over the collar (2) of the container, over which it is a push fit, and the two mating parts are pushed together. The ring (23) grips the collar (2) sufficiently tightly to hold the container in position; the key (20) on the container cooperates with the key way (24) to hold the container in a position in which the following pairs of contacts touch: (11) and (25); (14) and (26); and (19) and (27). The circuit so formed is shown in FIG. 6. The holder is now used to invert the container over the target to be sprayed, and liquid starts to drip from the channel (7). The switch (29) is at once turned to the 'on' position. This permits current flow from the battery (10) via contacts (11) and (25) to the generator (22); and this in turn causes a high potential (conveniently 15 kilovolts) to be conveyed from the terminal (34) via contacts (27) and (19) to the electrically conducting surface (17) of the cylinder (4). Meanwhile the electrically conducting surface (16) of the cylinder (3) is earthed, via contacts (14) and (26) and earth wire (32). An intense electrostatic field is thereby created between the two conducting surfaces (17) and (16), which causes liquid emerging adjacent to the surface (17) to atomise, and be projected downwardly as a fine spray, of controlled particle size towards any desired target. As the liquid passes out of the container through the annular channel (7), the decreasing pressure within the container is equalised by air passing up through the central capillary tube (8). Spraying is stopped by turning off the switch (29) and turning the container mouth upwards.

Various modifications to the foregoing apparatus will be apparent to those skilled in the art. The container illustrated is intended to be disposable. However, reusable containers may also be made, conveniently with rechargeable batteries. For reusable containers, it may be found necessary to make the nozzle and electrode, as well as other electrical connections, of metal rather than merely of a conductive coating or paint; and for this reason such reusable containers are substantially more expensive.

The device described includes a conductor for connection to earth in the form of a trailing bare metal wire. This has the disadvantage that it may become caught up or tangled. The device works best with an earth connection; but it need not be of low resistance. The conductor for connection to earth may be, for example, a metallised strip along the handle of the holder. When the operator grasps the handle, an electrical pathway to earth is formed through the operator's body. Though this pathway has high resistance, we have found that it is generally adequate. Experiments have shown that, with an arrangement of this kind, the voltage on the container electrode may be up to about one or two hundred volts above that of earth, even when the operator is wearing rubber boots in relatively dry conditions. Such a voltage on the electrode is little different from that of earth, relative to the potential on the nozzle of several thousand volts. The current flowing through the operator is so small that there is no danger to him whatever, nor can he even feel anything.

The apparatus of the invention has been described with particular reference to its use in pesticide spraying, in particular of compositions comprising pesticides in organic liquid carriers, for which it has special advantages. However, it also has advantages in respect to spraying of coatings or paints, for example by the home decorator. Holders for the container are conveniently adapted for holding in the hand; but they may also be carried on vehicles such as tractors or aircraft, when they may support more than one container. It may however be preferred to use, in tractors or aircraft, a form of the invention in which the spray nozzle is not integral with the container. In this case, a relatively large container can supply several spray nozzles; and electrical power may be supplied from batteries or generators carried in the vehicle.

Figure 7:
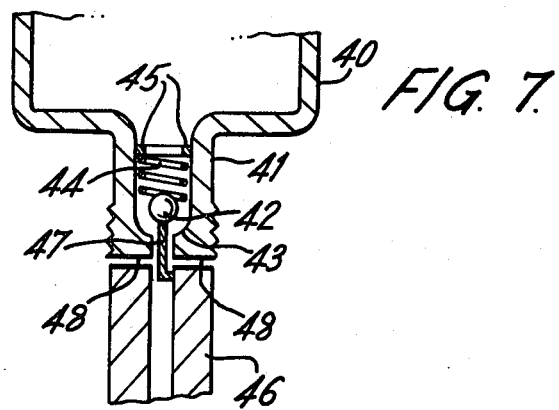
Figure 8:
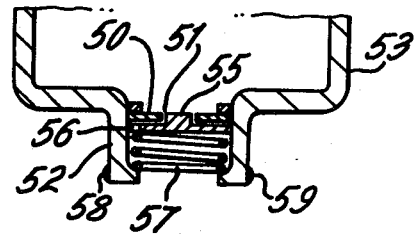
Figure 9:
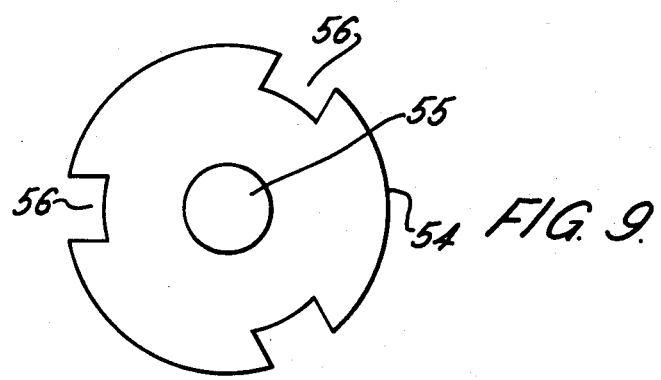

FIGS. 7, 8 and 9 illustrate two other closure devices which may be used in the containers of the invention. Both are illustrated in containers in which the spray nozzle is not integral. In FIG. 7, the container (40) has a neck (41) in which is mounted a simple mechanical ball valve, comprising a ball (42) urged against a seat (43) by a compression spring (44) mounted against stops (45). Prior to location on the spraying apparatus or holder (46), the ball valve prevents liquid leaving the container (40). On locating the container (40) on the apparatus (46), the ball (42) is forced inwards away from the seat (43) by a finger (47), permitting liquid to flow from the container (40) into the apparatus (46), for delivery to an electrostatic spray-head (not shown). At the same time, contacts (48) on the mouth of the neck (41) complete an electrical connection in the apparatus (46), permitting the supply of an appropriate high potential to the spray-head. FIG. 8 shows an alternative form of valve in a similar container; this valve is operated electrostatically. The valve comprises a metal plate (50) with a central port (51) mounted in the neck (52) of the container (53). Below the plate (50) is a second plate (54), shown in plan in FIG. 9. It has a central boss (55) which fits within the port (51) of plate (50) and closes it against passage of liquid. Plate (54) has peripheral slots (56), and is urged against plate (50) by a compression spring (57). Metal plates (50) and (54) are coated, on their lower and upper surfaces respectively, with a thin layer of a dialectric (epoxide resin). Contacts (58) and (59) on the outside of the neck (52) are electrically connected via the metal plates (50) and (54). In operation, the container (53) is mounted on a spraying apparatus (not shown) in fluid-tight engagement with a conduit leading to an electrostatic spray-head. Contacts (58) and (59) are thereby connected respectively to the output terminal of a high voltage generator and to the conducting surface of the electrostatic spray-head. A potential of about 20 kilovolts is thus applied to plates (50) and (54). This potential forces the plates apart by electrostatic repulsion against the action of the spring (57), and liquid flows from the container (53) through the port (51) and slots (56) into the apparatus for delivery to the spray-head. At the same time the spray-head receives a potential appropriate to atomise the liquid being delivered to it. Without the container on the apparatus, the electrostatic valve cannot open, and neither can potential be transmitted to the electrostatic spray-head.

I claim:

1. A liquid container adapted to form part of apparatus for electrostatic spraying, the apparatus including a power supply, high voltage generator having input and output terminals, a spray nozzle at least part of the surface of which is electrically conductive, an electrode disposed adjacent the nozzle and insulated therefrom, with electrical connections for connecting the power supply to the input terminals of the generator and the electrode to one output terminal of the generator and the nozzle to the other output terminal of the generator; said container comprising:
a body having an orifice for delivering liquid; means for detachably mounting the container on the rest of the apparatus in a position in which the orifice can deliver liquid to the spray nozzle, the mounting means including a conductor or conductors forming part of the electrical connections for the apparatus; and a closure or seal for closing the orifice prior to location of the container on the rest of the apparatus.

2. A liquid container as claimed in claim 1, wherein the seal is adapted to be opened in the act of location on the apparatus.

3. A container adapted to form part of apparatus as claimed in claim 1 for a liquid to be electrostatically sprayed, suitable for mounting on a holder, said holder forming a part of the apparatus carrying the high voltage generator, and wherein the container also includes: the spray nozzle, at least part of the surface of which is electrically conductive; and wherein the mounting means comprises means for detachably locating the container on the holder; and wherein the electrical connections comprise separate electrical connections from the nozzle and the electrode to separate contacts on the mounting means so placed that when the container is located on the holder by the mounting means each contact can make connection with one output terminal of the high voltage generator; and wherein said seal closes the orifice prior to location on the holder.

4. A container as claimed in claim 1 which contains a liquid suitable for electrostatic spraying.

5. A container as claimed in claim 4, in which the liquid is a composition comprising a pesticide in an organic liquid carrier.

6. A container adapted to form part of apparatus as claimed in claim 1 for liquid to be electrostatically sprayed, suitable for mounting on a holder, said holder forming part of the apparatus carrying the high voltage generator; wherein the container further includes the spray nozzle; a power source capable of providing sufficient energy to atomise electrostatically the actual or intended contents of the container; and wherein the mounting means comprises means for detachably locating the container on the holder; and wherein the electrical connections comprise separate electrical connections from the poles of the power source to separate contacts on the mounting means so placed that when the container is located on the holder by the mounting means each contact can make electrical connection with one input terminal of the generator; and wherein said seal closes the orifice prior to location on the holder.

7. A container as claimed in claim 6, wherein the power source is an electrical storage battery.

8. A container as claimed in claim 7, which further comprises an electrode disposed about the nozzle and insulated therefrom, the nozzle and the electrode being disposed to be electrically connected via contacts in the mounting means to opposite terminals of the generator when the container is located on the holder.

9. A container as claimed in claim 8, wherein the mounting means is provided with three contacts: a first contact for connecting one pole of the battery to a first input terminal of the generator; a second contact for connecting the nozzle to a first output terminal of the generator; and a third contact for connecting the electrode and the second pole of the battery to a conductor on the holder connected to the second input and output terminals of the generator, and capable of connection to earth.

10. A liquid container as recited in claim 1 further comprising the nozzle, said nozzle being positioned to receive liquid from said orifice.

11. Apparatus for electrostatic spraying of a liquid from a container comprising:
   a power source;
   a high voltage generator;
   a spray nozzle at least part of the surface of which is electrically conductive;
   an electrode disposed adjacent the nozzle and insulated therefrom, with incomplete electrical connections for connecting the power source to the input terminals of the generator, the electrode to one output terminal and the nozzle to the other output terminal of the generator;
   a conduit for conveying spray liquid from the container to the spray nozzle; and
   mounting means complementary to mounting means on the container for locating the container on the apparatus, said complementary mounting means including contacts adapted to complete the electrical connections via the container when the container is located on the apparatus, said container comprising a body having an orifice for delivering liquid, means for detachably mounting the container on the apparatus in a position in which the orifice can deliver liquid to the spray nozzle, and a closure or seal for closing the orifice prior to location of the container on the apparatus.

12. A sprayer including a power supply, high voltage generator, a spray nozzle at least part of the surface of which is electrically conductive, an electrode disposed adjacent the nozzle and insulated therefrom with electrical connections for connecting the power supply to the input terminals of the generator and the electrode to one output terminal of the generator and the nozzle to the output terminal of the generator, and a liquid container located upon a holder; wherein the container comprises
   a body having an orifice for delivering liquid, mounting means for locating the container on the holder in a position in which the orifice can deliver liquid to the spray nozzle, the mounting means including a conductor or conductors completing said electrical connections; and a closure or seal for closing the orifice prior to location of the container on the holder; and wherein the holder comprises
   a body carrying said high voltage generator, and mounting means complimentary to the mounting means on the container provided with electrical contacts complimentary to those on the container for connection to the output terminals of the high voltage generator.

* * * * *